United States Patent
Watanabe

(10) Patent No.: US 6,877,851 B2
(45) Date of Patent: Apr. 12, 2005

(54) INK SET FOR INK JET RECORDING, INK JET RECORDING PROCESS, AND RECORDED MATTER

(75) Inventor: Kazuaki Watanabe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 10/391,451

(22) Filed: Mar. 18, 2003

(65) Prior Publication Data

US 2004/0239738 A1 Dec. 2, 2004

(30) Foreign Application Priority Data

Mar. 19, 2002 (JP) .................................... P.2002-076941
Mar. 19, 2002 (JP) .................................... P.2002-076942

(51) Int. Cl.$^7$ .................................................. B41J 2/01
(52) U.S. Cl. ........................ 347/100; 347/96; 106/31.6; 523/160
(58) Field of Search ............................ 347/100, 96, 95; 106/31.13, 31.6; 523/160

(56) References Cited

U.S. PATENT DOCUMENTS 6,670,409 B2 * 12/2003 Yatake ........................ 347/100
2004/0020406 A1 * 2/2004 Kato ........................... 347/100

* cited by examiner

*Primary Examiner*—Manish Shah
(74) *Attorney, Agent, or Firm*—Ladas & Parry LLP

(57) ABSTRACT

The invention provides an ink set which includes: at least one dark pigment ink containing a pigment and water, wherein the pigment is one microencapsulated in a resin; and at least one light pigment ink containing a pigment, a resinous dispersant, and water, wherein the concentration of the pigment is up to ½ the pigment concentration in the dark pigment ink. The invention also provides an ink set which includes: at least one dark pigment ink containing a pigment, a resinous dispersant, and water; and at least one light pigment ink which contains a pigment, a resinous dispersant, and water, and in which the concentration of the pigment is up to ½ the pigment concentration in the dark pigment ink, wherein the resinous dispersant in the dark pigment ink has a lower acid value than the resinous dispersant in the light pigment ink.

24 Claims, No Drawings

INK SET FOR INK JET RECORDING, INK JET RECORDING PROCESS, AND RECORDED MATTER

FIELD OF THE INVENTION

The present invention relates to an ink set for ink jet recording, a processes for ink jet recording with the ink set, and recorded matter obtained by the process. More particularly, the invention relates to an ink set for ink jet recording which, when used in printing, gives images of excellent quality with almost no recognizable stain, and to a process for ink jet recording with the ink set and recorded matter obtained by the process.

BACKGROUND OF THE INVENTION

Ink jet recording is a process in which an ink is ejected as small droplets from a minute nozzle to record characters or images on a surface of a recording medium. Techniques of ink jet recording which have been put to practical use include: a method comprising converting electrical signals to mechanical signals with an electrostrictive element and intermittently ejecting an ink stored in a nozzle head to record characters or images on a surface of a recording medium; and a method comprising bubbling an ink stored in a nozzle head by rapidly heating that part of the ink which is located very close to the orifice and intermittently ejecting the ink based on the volume expansion caused by the bubbling to thereby record characters or images on a surface of a recording medium.

Known techniques for supplying inks in ink jet recording include a technique employing an ink set comprising a combination of inks of different colors. In ink jet recording with such an ink set, the kind and amount of the ink to be ejected from the ink set are always selected according to signals based on image information. This ink jet recording technique hence has an advantage that a color image such as, e.g., a photographic image can be easily obtained with high image quality.

An ink set comprising, in terms of one same hue, a plurality of inks having different colorant concentrations (which may be referred to as "deep/light ink set") is known. In application to an area to be printed so as to have a given printing density, an image having reduced graininess can be obtained by positively increasing the ink duty (applied amount of ink per unit area) for an ink having a low colorant concentration (which may be referred to as "light ink") in comparison with the ink duty of an ink having a high colorant concentration (which may be referred to as "dark ink").

However, especially when such an ink set is used in printing an image requiring an increased ink duty (in particular, a photographic image), then the paper (especially plain paper) absorbs the water contained in the inks and expands. The paper is hence apt to become wavy or bent to pose the possibility that the deformed paper might come into contact with the printer head to make the desired printing unavailable. For avoiding this trouble, printers are usually equipped with rollers which hold the paper therebetween to thereby keep it in a given position and preventing it from coming into contact with the head.

In general, as inks of the ink sets to be subjected to such printers, those prepared by dissolving various water-soluble dyes in an aqueous medium are commonly used. Recently, however, inks prepared by dispersing a pigment in an aqueous medium with the aid of a dispersant have also come to be provided. This is because such inks containing a pigment (which may be hereinafter referred to as "pigment inks") are characterized by being superior to inks containing a water-soluble dye in weatherability (e.g., water resistance and light resistance).

Pigments are generally insoluble in water. Consequently, when a pigment is used as a colorant in preparing an aqueous ink composition, the pigment is mixed with water together with a dispersant to stably disperse it before being formulated into an ink composition.

However, even the pigment ink thus prepared is less apt to penetrate into paper especially when plain paper is used or when an image requiring a high ink duty, such as, e.g., a photographic image, is to be formed. There is a problem that in ouch a case, the ink remaining unpenetrated on the paper is apt to adhere to the rollers and the resultant ink-bearing rollers are apt to stain the image (hereinafter, this phenomenon may be referred to as "ink transfer").

In the case where the dark/light ink set described above is used to conduct printing in order to reduce the graininess of images, the amount of the inks applied to the paper tends to be large, for example, because the duty of the light-color ink is regulated to be high. As a result, the inks are less apt to penetrate into the recording paper, and the irks remaining unpenetrated cause ink transfer and tend to result in recognizable stain on images.

Such stain on images is apt to be conspicuous especially when an ink set comprising dark and light inks having high pigment concentrations is used so as to obtain an image with high color development.

Furthermore, there is alas a problem that high speed printing, which is recently desired, tends to cause the ink to adhere to rollers before penetrating into the paper, and this may be a cause for accelerating ink transfer.

In addition, use of pigment inks has had a problem that although the inks have excellent weatherability as stated above, image fixation to the paper is insufficient or the recorded matter obtained is apt to have unevenness attributable to a difference in gloss between areas having different ink duties (which may be referred to as "gloss unevenness").

SUMMARY OF THE INVENTION

An object of the invention, which eliminates the problems described above, is to provide an ink set for ink jet recording which, when used in printing, gives images of excellent quality with almost no recognizable stain, attains excellent image fixation, and is less apt to cause gloss unevenness. Another object of the invention is to provide an ink jet recording process.

A still other object of the invention is to provide recorded matter which has excellent image quality with almost no recognizable stain, has excellent image fixation, and is less apt to have gloss unevenness.

Other objects and effects of the invention will become apparent from the following description.

The present inventors made extensive investigations and, as a result, have found that those objects can be achieved by using specific pigment inks in combination. The invention has thus been completed.

The invention provides the following (1) to (24).

(1) An ink set for ink jet recording which comprises: at least one dark pigment ink comprising a pigment and water, wherein the pigment is one microencapsulated in a resin; and at least one light pigment ink comprising a pigment, a resinous dispersant, and water, wherein the concentration of the pigment is up to ½ the pigment concentration in the dark pigment ink.

(2) The ink set for ink jet recording as described in (1) above, wherein the resinous dispersant in the light pigment ink is a block copolymer.

(3) The ink set for ink jet recording as described in (1) above, wherein the dark pigment ink is a cyan ink or a magenta ink.

(4) The ink set for ink jet recording as described in (3) above, wherein the pigment contained in the cyan ink is C.I. Pigment Blue 15:3.

(5) The ink set for ink jet recording as described in (3) above, wherein the cyan ink has a pigment concentration of 3% by weight or higher.

(6) The ink set for ink jet recording as described in (3) above, wherein the pigment contained in the magenta ink is C.I. Pigment Red 122.

(7) The ink set for ink jet recording as described in (3) above, wherein the magenta ink has a pigment concentration of 5% by weight or higher.

(8) The ink set for ink jet recording as described in (1) above, wherein the dark pigment ink and the light pigment ink each further contain a surfactant and a penetration accelerator.

(9) The ink met for ink jet recording as described in (8) above, wherein the surfactant comprises acetylene glycol and/or a polyorganosiloxane.

The ink set for ink jet recording as described in (8) above, wherein the penetration accelerator comprises a glycol ether and/or a 1,2-alkanediol.

(11) An ink jet recording process which comprises conducting ink jet recording with an ink set for ink jet recording as described in (1) above.

(12) Recorded matter obtained by an ink jet recording proceeds as described in (11) above.

(13) An ink set for ink jet recording which comprises: at least one dark pigment ink comprising a pigment, a resinous dispersant, and water; and at least one light pigment ink which comprises a pigment, a resinous dispersant, and water, and in which the concentration of the pigment is up to ½ th pigment concentration in the dark pigment ink, wherein the resinous dispersant in the dark pigment ink has a lower acid value than the resinous dispersant in the light pigment ink.

(14) The ink set for ink jet recording as described in (13) above, wherein the acid value of the resinous dispersant in the dark pigment ink is from 50 to 120 and the acid value of the resinous dispersant in the light pigment ink is 150 or higher.

(15) The ink set for ink jet recording as described in (13) above, wherein the dark pigment ink is a cyan ink or a magenta ink.

(16) The ink set for ink let recording as described in (15) above, wherein the pigment contained in the cyan ink is C.I. Pigment Blue 15:3.

(17) The ink set for ink jet recording as described in (15) above, wherein the cyan ink has a pigment concentration of 3% by weight or higher.

(18) The ink set for ink jet recording as described in (15) above, wherein the pigment contained in the magenta ink is C.I. Pigment Red 122.

(19) The ink set for ink jot recording as described in (15) above, wherein the magenta ink has a pigment concentration of 5% by weight or higher.

(20) The ink set for ink jet recording as described in (13) above, wherein the dark pigment ink and the light pigment ink each further contain a surfactant and a penetration accelerator.

(21) The ink set for ink jet recording as described in (20) above, wherein the surfactant comprises acetylene glycol and/or a polyorganosiloxane

(22) The ink set for ink jet recording as described in (20) above, wherein the penetration accelerator comprises a glycol ether and/or a 1,2-alkanediol.

(23) An ink jet recording process which comprises conducting ink jet recording with an ink set for ink jet recording as described in (13) above.

(24) Recorded matter obtained by the ink jet recording process as described in (23) above.

DETAILED DESCRIPTION OF THE INVENTION

The invention will be explained below in detail.

The first ink set for ink jet recording of the invention (which may be referred to simply as "first ink set" or "ink set") comprises: at least one dark pigment ink comprising a pigment and water, wherein the pigment is one microencapsulated in a resin; and at least one light pigment ink comprising a pigment, a resinous dispersant, and water, wherein the concentration of the pigment is up to ½ the pigment concentration in the dark pigment ink.

The second ink set for ink jet recording of the invention (which may be referred to simply as "second ink set" or "ink set") comprises: at least one dark pigment ink comprising a pigment, a resinous dispersant, and water; and at least one light pigment ink which comprises a pigment, a resinous dispersant, and water and in which the concentration of the pigment is up to ½ the pigment concentration in the dark pigment ink, wherein the resinous dispersant in the dark pigment ink has a lower acid value than the resinous dispersant in the light pigment ink.

Any pigment can be selected as the pigment to be used in each of the dark pigment inks and light pigment inks according the invention, as long as it can be dispersed in the ink with a dispersant. Consequently, such a pigment may be one which develops any color after used in recording on a recording medium. It may be either an inorganic pigment or an organic pigment, or may be a mixture of these.

As the inorganic pigment can be used titanium oxide, iron oxide, and carbon black produced by any of known processes such as the contact process, furnace process, and thermal process. As the organic pigment can be used azo pigments (including azo lakes, insoluble azo pigments, condensation azo pigments, chelate azo pigments, and the like), polycyclic pigments (e.g., phthalocyanine pigments, perylene pigments, perinone pigments, anthraquinone pigments, quinacridone pigments, dioxazine pigments, thioindigo pigments, isoindolinone pigments, and quinophthalone pigments), dye chelates (e.g., basic dye chelates and acid dye chelates), nitro pigments, nitroso pigments, aniline black, and the like.

Examples of pigments usable in the invention are as follows. Examples of pigments for yellow inks include C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 99, 100, 101, 104, 108, 109, 110, 114, 117, 120, 128, 129, 138, 150, 151, 153, 154, and 180.

Examples of pigments for magenta inks include C.I. Pigment Red 1, 2, 3, 4, 5, 6, 7, 8, 9, 10, 11, 12, 13, 14, 15, 16, 17, 13, 19, 21, 22, 23, 30, 31, 32, 37, 39, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (red iron oxide), 104, 105, 106, 108, (cadmium red), 112, 114, 122 (quinacridone magenta), 123, 146, 149, 163, 166, 168, 170, 172, 177, 178, 179, 184, 185, 190, 193, 202, 209, and 219. Especially preferred is C.I. Pigment Red 122.

Examples of pigments for cyan inks include C.I. Pigment Blue 1, 2, 3, 15, 15:1, 15:2, 15:3, 15:34, 16, 17:1, 22, 25, 56, and 60 and C.I. Vat Blue 4, 60, and 63. Especially preferred is C.I. Pigment Blue 15:3.

Examples of pigments for other color inks include C.I. Pigment Orange 5, 13, 16, 17, 36, 43, and 51, C.I. Pigment Green 1, 4, 7, 8, 10, 17, 18, and 36, and C.I. Pigment Violet 1 (rhodamine lake), 3, 5:1, 16, 19 (quinacridone red), 23, and 38. Also usable besides these are processed pigments, e.g., graft carbon, obtained by treating the surface of a pigment with, e.g., a resin.

Examples of black pigments include carbon blacks. Specific examples of the carbon blacks include: No. 2300, No. 900, MCF88, No. 33, No. 40, No. 45, No. 52, MA7, MA8, MA100, and No. 2200B, manufactured by Mitsubishi Chemical Corp.; Raven 5750, Raven 5250, Raven 5000, Raven 3500, Raven 1255, and Raven 700, manufactured by Columbian Carbon Co.; Regal 400R, Regal 330R, Regal 660R, Mogul L, Monarch 700, Monarch 800, Monarch 880, Monarch 900, Monarch 1000, Monarch 1100, Monarch 1300, and Monarch 1400, manufactured by Cabot Crop.; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4, manufactured by Degussa AG.

The pigments enumerated above may be used alone, or two or more pigments may be selected from one or more of those groups and used in combination.

The particle diameter of each pigment to be used in the invention is preferably 0.2 $\mu$m or smaller, more preferably from 0.05 to 0.15 $\mu$m.

The content of the pigment in each dark pigment ink (in the case of a microencapsulated pigment, the content is on the basis of the weight of the pigment after microencapsulation) is preferably from 2 to 10% by weight, more preferably from 2 to 6% by weight, based on the whole amount of the ink. The content of the pigment in each light pigment ink is preferably from 0.1 to 2% by weight, more preferably from 0.2 to 1.0% by weight, based on the whole amount of the ink.

In the case where the dark pigment ink is a cyan ink, the pigment concentration in this cyan ink is preferably regulated to 3% by weight or higher. In the case where the dark pigment ink is a magenta ink, the pigment concentration of this magenta ink is preferably regulated to 5% by weight or higher. With such dark pigment inks, recorded matter which not only has almost no recognizable stain but has excellent color development can be obtained.

Next, the pigment microencapsulated in a resin which is contained in the dark pigment ink in the first ink set for ink jet recording of the invention will be explained.

The resin of the microencapsulated pigment is not particularly limited. However, it is preferably a high-molecular compound having the ability to disperse or dissolve itself in water and having anionic groups (acidic nature). This resin generally has a number-average molecular weight of preferably about from 1,000 to 100,000, especially preferably about from 3,000 to 50,000. This resin preferably is one which dissolves in organic solvents to give solutions. When the number-average molecular weight of the resin is within that range, the resin can sufficiently function as the shell film in the pigment or as a coating film in an ink composition.

The resin may be one which itself has the ability to disperse or dissolve itself, or may be one to which such function has been imparted. Consequently, it may be a resin into which anionic groups such as, e.g., carboxyl, sulfo, or phospho groups have been incorporated by neutralization with, e.g., an organic amine or alkali metal. Furthermore, the resin may be one having one or more anionic groups of the same or different kinds. In the invention, it is preferred to use a resin into which carboxyl groups have been incorporated by neutralization with a base.

As stated above, it is preferred in the invention to use a resin in the form of a salt with an alkali metal or organic amine. Use of a resin in such a salt form makes it possible to provide an ink excellent in redispersibility and reliability. Examples of the salt of a resin with an alkali metal include salts with lithium, sodium, and potassium. Preferred examples thereof include alkali metal salts formed with sodium hydroxide, potassium hydroxide, and lithium hydroxide. More preferred examples include salts formed with potassium hydroxide. Examples of the salt of a resin with an organic amine include salts with volatile amine compounds such as ammonia, triethylamine, tributylamine, dimethylethanoline, diisopropanolamine, and morpholine; and salts with less volatile high-boiling organic amines such as diethanolamine and triethanolamine.

Examples of the resin of the microencapsulated pigment include materials having anionic groups. Specific examples thereof include vinyl polymers such as poly(vinyl chloride), poly(vinyl acetate), poly(vinyl alcohol), and poly(vinyl butyral), polyesters such as alkyd resins and phthalic acid resins, amino resin materials such as melamine resins, melamine-formaldehyde resins, amino-alkyd co-condensation resins, and urea resins, thermoplastic, thermoset, or modified polymers which are acrylic epoxy, polyurethane, polyether, polyamide, unsaturated polyester, phenolic, silicone, and fluorinated polymers, and copolymers or mixtures thereof.

The resin to be used for producing the microencapsulated pigment may be a resin which itself has reactive pendant groups, such as glycidyl, isocyanate, or hydroxyl groups or $\alpha,\beta$-ethylenically unsaturated double bonds (vinyl groups), which have been incorporated therein beforehand. Alternatively, use may be made of a mixture of a resin with a crosslinking agent having reactive groups, e.g., a melamine resin, urethane resin, or epoxy resin, or with a photocuring agent, e.g., an ethylenically unsaturated monomer or oligomer. Resins which have undergone such a treatment can give pigment-surrounding walls further improved in properties such as solvent resistance and durability. Such resins further have an advantage that they enhance the film strength of coating films formed from the ink on a recording medium.

Of the resins enumerated above, the anionic acrylic resins are obtained, for example, by polymerizing one or more acrylic monomers having at least one anionic group (hereinafter referred to as "anionic-group-containing acrylic monomers") in a solvent optionally with one or more monomers copolymerizable therewith. Examples of the anionic-group-containing acrylic monomers include acrylic monomers having one or more anionic groups selected from the group consisting of carboxyl, sulfo, and phospho groups. Especially preferred of these are acrylic monomers having one or more carboxyl groups.

Examples of the acrylic monomers having one or more carboxyl groups include acrylic acid, methacrylic acid, crotonic acid, ethacrylic acid, propylacrylic acid, isopropylacrylic acid, itaconic acid, and fumaric acid. Preferred of these are acrylic acid and methacrylic acid.

Examples of the acrylic monomers having one or more sulfo groups include sulfoethyl methacrylate and butylacrylamidesulfonic acid.

Examples of the acrylic monomers having one or more phospho groups include phosphoethyl methacrylate.

Examples of the optional monomers copolymerizable with the anionic-group-containing acrylic monomers include (meth)acrylic esters such as methyl acrylate, ethyl acrylate, isopropyl acrylate, n-propyl acrylate, n-butyl acrylate, t-butyl acrylate, 2-ethylhexyl acrylate, n-octyl acrylate, lauryl acrylate, benzyl acrylate, methyl methacrylate, ethyl methacrylate, isopropyl methacrylate, n-propyl methacrylate, n-butyl methacrylate, isobutyl methacrylate, t-butyl methacrylate, 2-ethylhexyl methacrylate, n-octyl methacrylate, lauryl methacrylate, stearyl methacrylate, tridecyl methacrylate, and benzyl methacrylate; adducts of a fatty acid with a (meth)acrylic ester monomer having an oxirane structure, such as an adduct of stearic acid with glycidyl methacrylate; adducts of an oxirane compound containing an alkyl group having 3 or more carbon atoms with (meth)acrylic acid; styrene monomers such as styrene, α-methylstyrene, o-methylstyrene, m-methylstyrene, p-methylstyrene, and p-tert-butylstyrene; itaconic esters such as benzyl itaconate; maleic esters such as dimethyl maleate; fumaric esters such as dimethyl fumarate; and acrylonitrile, methacrylonitrile, vinyl acetate, isobornyl acrylate, isobornyl methacrylate, aminoethyl acrylate, aminopropyl acrylate, methylaminoethyl acrylate, methylaminopropyl acrylate, ethylaminoethyl acrylate, ethylaminopropyl acrylate, aminoethylacrylamide, aminopropylacrylamide, methylaminoethylacrylamide, methylaminopropylacrylamide, ethylaminoethylacrylamide, ethylaminopropylacrylamide, methacrylamide, aminoethyl methacrylate, aminopropyl methacrylate, methylaminoethyl methacrylate, methylaminopropyl methacrylate, ethylaminoethyl methacrylate, ethylaminopropyl methacrylate, aminoethylmethacrylamide, aminopropylmethacrylamide, methylaminoethylmethacrylamide, methylaminopropylmethacrylamide, ethylaminoethylmethacrylamide, ethylaminopropylmethacrylamide, hydroxymethyl acrylate, 2-hydroxyethyl acrylate, 2-hydroxypropyl acrylate, hydroxymethyl methacrylate, 2-hydroxyethyl methacrylate, 2-hydroxypropyl methacrylate, N-methylolacrylamide, and allyl alcohol.

Monomers having crosslinking functional groups are usable, and examples thereof are as follows.

A polymerizable monomer having a blocked isocyanate group can be easily produced by subjecting a polymerizable monomer having an isocyanate group, e.g., 2-methacryloyloxyethyl isocyanate, to addition reaction with a known blocking agent. Alternatively, it can be easily produced by subjecting any of the aforementioned vinyl copolymers having a hydroxyl group and a carboxyl group to addition reaction with a compound having an isocyanate group and a blocked isocyanate group. The compound having an isocyanate group and a blocked isocyanate group can be easily obtained by the addition reaction of a diisocyanate compound with a known blocking agent in a proportion of about 1:1 by mole.

Examples of monomers having an epoxy group include glycidyl (meth)acrylate and (meth)acrylate monomers having an alicyclic epoxy group.

Examples of monomers having a 1,3-dioxolan-2-on-4-yl group include 1,3-dioxolan-2-on-4-ylmethyl (meth)acrylate and 1,3-dioxolan-2-on-4-ylmethyl vinyl ether.

Examples of polymerization initiators include peroxides such as t-butyl peroxybenzoate, di-t-butyl peroxide, cumene hydroperoxide, acetyl peroxide, benzoyl peroxide, and lauroyl peroxide; and azo compounds such as azobisisobutyronitrile, azobis-2,4-dimethylvaleronitrile, and azobiscyclohexanecarbanitrile.

Examples of the solvent to be used when the anionic-group-containing acrylic monomers are polymerized optionally with other monomers copolymerizable therewith include aliphatic hydrocarbon solvents such as hexane and mineral spirit; aromatic hydrocarbon solvents such as benzene, toluene, and xylene; ester solvents such as butyl acetate; ketone solvents such as methyl ethyl ketone and isobutyl methyl ketone; alcohol solvents such as methanol, ethanol, butanol, and isopropyl alcohol) and aprotic polar solvents such as dimethylformamide, dimethyl sulfoxide, N-methylpyrrolidone, and pyridine. These solvents may be used in combination of two or more thereof.

The resin to be used for encapsulating a pigment therein in the invention preferably is one which further contains a hardener and/or a polymeric compound. It is more preferred to use a pigment obtained by encapsulation with a material containing a hardener and/or a polymeric compound. The hardener or polymeric compound hardens the walls surrounding the colorant and also serves to enhance the coating film strength after incorporation in an ink.

Examples of the hardener usable in the invention include amino resins such as melamine resins, benzoguanamine resins, and urea resins; phenolic resins such as trimethylolphenol and condensates thereof; polyisocyanates such as tetramethylene diisocyanate (TDI), diphenylmethane diisocyanate (MDI), hexamethylene diisocyanate (HDI), naphthaleno diisocyanate (NDI), isophorone diisocyanate (IPDI), xylylene diisocyanate (XDI), and modified or blocked isocyanates obtained from these; amines such as aliphatic amines, aromatic amines, N-methylpiperazine, triethanolamine, morpholine, dialkylaminoethanols, and benzyldimethylamine; polycarboxylic acids; acid anhydrides such as phthalic anhydride, maleic anhydride, hexahydrophthalic anhydride, pyromellitic anhydride, benzophenonetetracarboxylic anhydride, and ethylene glycol bistrimellitate; epoxy compounds such as bisphenol A epoxy resins, phenolic epoxy resins, glycidyl methacrylate copolymers, resins of carboxylic acid glycidyl eaters, and alicyclic epoxies; alcohols such as polyether polyols, polybutadiene glycols, polycaprolactone polyols, and trishydroxyethyl isocyanate (THEIC); and unsaturated-group-containing vinyl compounds to be subjected to radical curing with a peroxide, UV curing, or electron beam curing, such as polyvinyl compounds, polyallyl compounds, and products of the reaction of a glycol or polyol with acrylic or methacrylic acid.

It is more preferred to add a photoinitiator, polymerization initiator, or catalyst according to need to accelerate curing. Examples of the photoinitiator include benzoin compounds, anthraquinone compounds, benzophenone compounds, sulfur-containing compounds, and dimethylbenzyl ketal. However, unable photoinitiators should not be construed as being limited to these. Examples of the polymerization initiator include peroxides such as t-butyl peroxybenzoate, de-t-butyl perioxide, cumene hydroperoxide, acetyl peroxide, benzoyl peroxide, and lauroyl peroxide; and azo compounds such as azobisisobutyronitrile, azobis-2,4-dimethylvaleronitrile, and azobiscyclohexanecarbonitrile. Examples of the catalyst include Co compounds and Pb compounds.

With respect to the polymeric compound to be used in the invention, any polymeric compound can be employed without particular limitations as long as it has a number-average molecular weight of 1,000 or higher. It is, however, preferred to use a polymeric compound having a number-average molecular weight of from 3,000 to 100,000 from the standpoints of ink film strength and formation of walls surrounding a pigment.

The kind of the polymeric compound is not particularly limited. Examples thereof include vinyl polymers such as poly(vinyl chloride), poly(vinyl acetate), poly(vinyl alcohol), and poly(vinyl butyral), polyesters such as alkyd resins and phthalic acid resins, amino resins such as melamine resins, melamine-formaldehyde resins, amino-alkyd co-condensation resins, and urea resins, thermoplastic, thermosetting, or modified polymeric compounds which are acrylic, epoxy, polyurethane, polyether, polyamide, unsaturated polyester, phenolic, silicone, and fluorinated polymers, and copolymers or mixtures thereof.

Production of Microencapsulated Pigment

A microencapsulated pigment can be produced from the ingredients described above by any of physical and chemical methods heretofore in use. According to a preferred embodiment of the invention, it can be produced by the process disclosed in JP-A-9-151342, JP-A-10-140065, JP-A-11-209672, JP-A-11-172180, JP-A-10-25440, or JP-A-11-43636. The processes disclosed in these are roughly explained below.

In JP-A-9-151342 and JP-A-10-140065 are disclosed the "phase inversion process" and the acid precipitation process".

a) "Phase Inversion Process"

The term "phase inversion process" as used in the invention basically means a self-dispersion (phase inversion emulsification) process in which a molten mixture of a resin having the ability to disperse or dissolve itself with a pigment is dispersed in water. This molten mixture may be one containing the hardener or polymeric compound described above. This molten mixture can have any of: the state in which the pigment mixed is in an undissolved state, the state in which the pigment mixed is in a dissolved state; and the state in which the pigment mixed is in these two states.

b) "Acid Precipitation Process"

The term "acid precipitation process" as used in the invention means a process for producing a microencapsulated pigment by preparing a hydrous cake comprising a resin and a pigment and neutralizing part or all of the anionic groups of the resin in the hydrous cake with a basic compound.

Specifically, the "acid precipitation process" comprises the steps of:

(1) dispersing a resin and a pigment in an alkaline aqueous medium and optionally heating the dispersion to thereby cause the resin to gel;

(2) adjusting the pH of the gel to a neutral or acid value to thereby hydrophobize the resin and tenaciously bond the resin to the pigment;

(3) optionally conducting filtration and rinsing with water to obtain a hydrous cake;

(4) neutralizing part or all of the anionic groups of the resin in the hydrous cake with a basic compound and then redispersing the resin in an aqueous medium; and (5) optionally conducting a heat treatment to cause the resin to gel.

More specific procedures of the "phase inversion process" and "acid precipitation process" described above may be the same as those disclosed in JP-A-9-151342 and JP-A-10-140065.

In JP-A-11-209672 and JP-A-11-172180 is disclosed a process for producing a colorant. This process basically comprises the following steps:

(1) mixing either a resin having anionic groups or a solution prepared by dissolving the resin in an organic solvent with a basic compound to neutralize the resin;

(2) mixing this mixture with a pigment to prepare a suspension and then dispersing the pigment with a disperser or the like to obtain a pigment dispersion;

(3) optionally removing the solvent by distillation;

(4) adding an acid compound to precipitate a resin having anionic groups and thereby coat the pigment with the resin having anionic groups;

(5) optionally conducting filtration and rinsing with water; and (6) adding a basic compound to neutralize the anionic groups of the anionic-group-containing reign and dispersing the resin in an aqueous medium to obtain an aqueous dispersion.

More specific procedures of the process may be the same as those disclosed in JP-A-11-209672 and JP-A-11-172180.

Next, the dark pigment ink in the second ink set for ink jet recording of the invention will be explained.

In the dark pigment ink in the second ink set of the invention, the pigment has been dispersed in the ink with the aid of a resinous dispersant. Preferred examples of the resinous dispersant include natural polymers.

Specific examples thereof include proteins such as glue, gelatin, casein, and albumin, natural gums such as gum arabic and tragacanth gum, glucosides such as saponin, alginic acid and derivatives thereof such as propylene glycol alginate, triethanolamine alginate, and ammonium alginate, and cellulose derivatives such as methyl cellulose, carboxymethyl cellulose, hydroxyethyl cellulose, and ethyl hydroxycelluose.

Preferred examples of the resinous dispersant further include synthetic polymers. Specific examples thereof include poly(vinyl alcohol) and derivatives thereof; polyvinylpyrrolidone and derivatives thereof; acrylic resins such as poly(acrylic acid), acrylic acid/acrylonitrile copolymers, potassium acrylate/acrylonitrile copolymers, vinyl acetate/acrylic ester copolymers, and acrylic acid/acrylic ester copolymers; styrene/acrylic resins such as styrene/acrylic acid copolymers, styrene/methacrylic acid copolymers, styrene/methacrylic acid/acrylic ester copolymers, styrene/α-methylstyrene/acrylic acid copolymers, and styrene/α-methylstyrene/acrylic acid/acrylic ester copolymers; styrene/maleic acid copolymers; styrene/maleic anhydride copolymers; vinylnaphthalene/acrylic acid copolymers; vinylnaphthalene/maleic acid copolymers; vinyl acetate copolymers such as vinyl acetate/ethylene copolymers, vinyl acetate/fatty acid vinyl ester/ethylene copolymers, vinyl acetate/maleic ester copolymers, vinyl acetate/crotonic acid copolymers, and vinyl acetate/acrylic acid copolymers; and salts of these.

Especially preferred of those are copolymers of a monomer having a hydrophobic group and a monomer having a hydrophilic group and polymers having both hydrophobic groups and hydrophilic groups in the molecular structure. The copolymers may be either random copolymers or block copolymers.

Examples of the salts include salts with diethylamine, ammonia, ethylamine, triethylamine, propylamine, isopropylamine, dipropylamine, butylamine, isobutylamine, triethanolamine, diethanolamine, aminomethylpropanol, and morpholine.

Such a compound for salt formation may be used in any amount not less than the neutralization equivalent for the dispersant consisting of the organic material to be converted to a salt. However, the compound is preferably added in an amount about 1.3 times the neutralization equivalent from the standpoint of ink fixation after printing.

Those copolymers have a weight-average molecular weight of preferably from 1,000 to 50,000, more preferably from 3,000 to 10,000.

In the case of using those resinous dispersants, the amount of the dispersants to be added is preferably about from 10 to 100% by weight, more preferably in the range of from 20 to 50% by weight, based on the pigment (this applied in the case of the light pigment ink).

Especially preferred resinous dispersants in the invention are salts of styrene/(meth)acrylic acid copolymers. The styrene/(meth)acrylic acid copolymer salts mean polymers which basically have a structure comprising at least styrene frameworks and (meth)acrylic acid salt frameworks and which may have, in the structure, frameworks derived from one or more other monomers having an unsaturated group, e.g., (meth)acrylic ester frameworks. These styrene/(meth) acrylic acid copolymer salts may be either random copolymers or block copolymers, and can be produced by a known polymerization method such as, e.g., radical polymerization or group transfer polymerization. The acid values of these styrene/(meth)acrylic acid copolymer salts are preferably from 50 to 300, more preferably from 70 to 150. The molecular weights thereof are in the range of preferably from 1,000 to 50,000, more preferably from 1,000 to 15,000, most preferably from 3,000 to 10,000, in terms of weight-average molecular weight.

As the resinous dispersant can be used a commercial one. Examples thereof include Joncryl 68 (molecular weight, 10,000; acid value, 195), Joncryl 680 (molecular weight, 3,900; acid value, 215), Joncryl 692 (molecular weight, 1,600; acid value, 235), Joncryl 550 (molecular weight, 7,500; acid value, 200), Joncryl 555 (molecular weight, 5,000; acid value, 200), Joncryl 586 (molecular weight, 3,100; acid value 105), Joncryl 683 (molecular weight, 7,300; acid value, 150), and B-36 (molecular weight, 6,800; acid value, 250), all manufactured by Johnson Polymer Corp.

The acid values of those resinous dispersants can be regulated by changing the proportion of a monomer having carboxy group (e.g., an acrylic eater or styrene). The acid value of a resinous dispersant is the number of milligrams of potassium hydroxide necessary for neutralizing the free fatty acid contained in 1 g of the resin.

In the second ink set of the invention, it is essential that the acid value of the resinous dispersant in the dark pigment ink should be lower than the acid value of the resinous dispersant in the light pigment ink. The acid value of the resinous dispersant in the dark pigment ink is preferably from 50 to 120, more preferably from 50 to 90. The acid value of the resinous dispersant in the light pigment ink is preferably 150 or higher, more preferably from 170 to 250. By regulating the acid values of the resinous dispersants so as to be within the preferred ranges, recognizable image stain can be diminished with higher certainty.

The dark pigment ink and light pigment ink in the second ink set of the invention differ from each other in pigment concentration and in the acid value of the resinous dispersant. Except these, the pigment and other ingredients may be common to these inks.

The light pigment ink in each of the first and second ink sets of the invention will be explained next. The light pigment ink in the invention contains a pigment dispersed therein with the aid of a resinous dispersant. The resinous dispersant is not particularly limited. However, preferred examples of resinous dispersants usable in the light pigment ink especially in the second ink set include the resinous dispersants enumerated above with regard to the dark pigment ink in the second ink set. With respect to the light pigment ink in the first ink set, resinous dispersants (hereinafter sometimes referred to simply as "dispersants") usable therein may be any of homopolymers, random copolymers, and block copolymers. However, the resinous dispersants for the light pigment ink in the first ink set especially preferably are block copolymers.

In a preferred embodiment of the invention, the dispersant preferably is the dispersant described in JP-A-11-269418. This preferred dispersant is a block copolymer having an AB, ABA, or ABC structure. In these structures, block A is hydrophilic, and block B is hydrophobic and comprises, based on the block B, at least 30% by weight units derived from one or more nonacrylic monomers selected from the group consisting of the following (1) to (4). Block C is an optional block.

(1) $CH_2=CH—R$
   (wherein R is a $C_6$ to $C_{20}$, substituted or unsubstituted alkyl, aryl, aralkyl, or alkaryl group; the substituted embodiments mean to include alkyl, aryl, aralkyl, and alkaryl groups having one or more substituents which do not inhibit a polymerization process and examples of which include hydroxy, amino, ester, acid, acyloxy, amide, nitrile, halogen, haloalkyl, and alkoxy; and specific examples include styrene, α-methylstyrene, vinylnaphthalene, vinylcyclohexane, vinyltoluene, vinylanisole, vinylbiphenyl, and vinyl-2-norbornene);

(2) $CH_2=CH—OR^1$
   (wherein $R^1$ is a $C_3$ to $C_{20}$, substituted or unsubstituted alkyl, aryl, aralkyl, or alkaryl group; the substituted embodiments has the same meaning as defined above; specific examples include vinyl n-propyl ether, vinyl t-butyl ether, vinyl decyl ether, vinyl isooctyl ether, vinyl octadecyl ether, and vinyl phenyl ether);

(3) $CH_2=CH—O—C(O)—R^1$
   (wherein $R^1$ is the same as defined in (2) above; specific examples include vinyl propionate, vinyl butyrate, vinyl n-decanoate, vinyl stearate, vinyl laurate, and vinyl benzoate); and (4) $CH_2=CH—NR^2R^3$
   (wherein $R^2$ and $R^3$ are independently selected from the group consisting of H and $C_3$ to $C_{20}$, substituted or unsubstituted alkyl, aryl, aralkyl, and alkaryl groups, provided that not both of $R^2$ and $R^3$ are H; the substituted embodiments have the same meanings as defined above; specific examples include N-vinylcarbazole and vinylphthalimide).

In the block copolymer having an AB, ABA, or ABC structure, each character indicate a block in the copolymer. Namely, different characters respectively indicate blocks having different monomer compositions, and like characters indicate blocks having the same monomer composition. Consequently, an AB block copolymer is a diblock copolymer made up of two different blocks, while an ABA block copolymer is made up of three blocks of two different kinds (i.e., the two blocks A are the same). An ABC block copolymer also is made up of three blocks, but all the three blocks differ from one another.

Whichever block copolymer is used with respect to the structures described above, block B is hydrophobic and is capable of bonding to pigments. Block A is hydrophilic and is soluble in aqueous vehicles. The third block (either block A or block C) can be selected at will and can be used for the purpose of making a minor adjustment of the hydrophobic/hydrophilic balance for the polymer. Consequently, this third block may have the same composition as the hydrophilic block as in ABA, or may have a composition different from each of A and B, as in ABC. The term "aqueous vehicle" as used herein generally means a vehicle comprising water and one or more water-soluble organic solvents.

The size of the hydrophobic block should be sufficiently large so as to form effective bonds on the pigment surface. The number-average molecular weight thereof is at least 300, preferably at least 500. The hydrophilic block also should be sufficiently large so as to bring about a steric stabilization mechanism and an electrostatic stabilization mechanism which are necessary for stable dispersion. It is desirable that the size of the hydrophilic block be balanced with the size of the hydrophobic block so that the polymer as a whole is soluble in aqueous vehicles.

The hydrophobic block may contain units derived from one or more other ethylenically unsaturated monomers, i.e., acrylic monomers. Examples of such monomers include $C_1$ to $C_{20}$ esters of acrylic or methacrylic acid. Specific examples thereof include methyl acrylate, ethyl acrylate, n-butyl acrylate, 2-ethylhexyl acrylate, methyl methacrylate, ethyl methacrylate, n-butyl methacrylate, t-butyl methacrylate, 2-ethylhexyl methacrylate, and cyclohexyl methacrylate.

The hydrophilic block can be prepared from an ethylenically unsaturated monomer. This hydrophilic block should be soluble in an aqueous vehicle selected. It may contain ionizable monomer units in an amount of up to 100% by weight and preferably at least 50% by weight based on the whole weight of the hydrophilic block. The selection of an ionic monomer depends on desired ionic characteristics of the ink in the application to be selected. In the case of an anionic block copolymer dispersant, the ionic monomer to be mainly selected is a monomer having an acid group or an acid precursor group. Examples of useful monomers include acrylic acid, methacrylic acid, crotonic acid, itaconic acid, itaconic acid monoesters, maleic acid, maleic acid monoesters, fumaric acid, and fumaric acid monoesters.

In the case of a cationic block copolymer dispersant, preferred ionic monomers for the hydrophilic block are amine-containing monomers. The amine groups may be primary, secondary, or tertiary amine groups, or may be a mixture of these. Examples of the amine-containing monomers include N,N-dimethylaminoethyl acrylate, N,N-dimethylaminoethyl methacrylate, N,N-diethylaminoethyl methacrylate, t-butylaminoethyl methacrylate, 2-N-morpholinoethyl acrylate, 2-N-morpholinoethyl methacrylate, 4-aminostyrene, 2-vinylpyridine, 4-vinylpyridine, and vinylimidazole.

It is possible to suitably use nonionic hydrophilic monomers or water-soluble monomers to thereby make a minor adjustment of a hydrophobic/hydrophilic balance and regulate the solubility characteristics of the block copolymer. These monomers can be easily copolymerized with the hydrophobic block or hydrophilic block or with a third block, e.g., the block C in an ABC block copolymer, to thereby produce the desired effect. Useful examples thereof include alkyl acrylates and alkyl methacrylates in which each alkyl group has 1 to 12 carbon atoms, such as methyl acrylate, methyl methacrylate, ethyl acrylate, ethyl methacrylate, butyl acrylate, and butyl methacrylate, and further include acrylamide and methacrylamide.

The block copolymer usable as a dispersant in the invention can be efficiently produced by simultaneously and continuously forming two or more blocks using a macromonomer as an intermediate. A macromonomer having a polymerizable double bond at an end becomes one block of a block copolymer, and this macromonomer is prepared first. Subsequently, this macromonomer is copolymerized with a monomer selected from a second block. In the case of an ABA or ABC triblock copolymer, it is preferred to initiate copolymer production with the synthesis of a hydrophilic macromonomer as a first block. In the case of an AB block copolymer, an effective first step in producing the copolymer is to synthesize a hydrophobic macromonomer or a hydrophilic macromonomer. Such macromonomers are advantageously prepared by the free-radical polymerization method. For this polymerization, cobalt(II) and cobalt(III) complexes are used as catalytic chain-transfer agents or organic chain-transfer agents which make chain transfer possible. The organic chain-transfer agents include methacrylate oligomers having a sulfurized allyl, bromoallyl, or vinyl terminal group, which include dimers, $\alpha$-methylstyrene dimers, and related compounds. The block copolymer can be synthesized via a macromonomer as taught by International Publication WO 96/15157 (June, 1996). Block copolymers useful in the invention have a weight-average molecular weight of about from 1,000 to 50,000, preferably from 2,000 to 20,000. An AB block copolymer prepared by the method described above, which is terminated by a polymerizable double bond, is further polymerized with another group of a monomer through related-art free-radical polymerization by the method described above to thereby form an ABA or ABC block copolymer.

Many organic solvents in ordinary use can be used as polymerization media for preparing both macromonomers and block copolymers. Examples thereof include alcohols such as methanol, ethanol, n-propanol, and isopropanol; ketones such as acetone, butanone, pentanone, and hexanone; ethers such as tetrahydrofuran, diethyl ether, and ethylene glycol monoalkyl ethers, ethylene glycol dialkyl ethers, polyethylene glycol monoalkyl ethers, and polyethylene glycol dialkyl ethers, e.g., commonly available Cellosolves and Carbitols; alkyl esters of acetic acid, propionic acid, and butyric acid; glycols such as ethylene glycol; and mixture of these. However, usable solvents should not be construed as being limited to these.

In order for a block copolymer to become soluble in aqueous vehicles, the hydrophilic block thereof should yield a salt of the ionic groups. A salt of acid groups is prepared by neutralizing these groups with a neutralizing agent. Examples of useful bases include alkali metal hydroxides (lithium hydroxide, sodium hydroxide, and potassium hydroxide), the carbonates and hydrogen carbonates of alkali metals (sodium carbonate, potassium carbonate, sodium hydrogen carbonate, and potassium hydrogen carbonate), organic amines (monomethylamine, dimethylamine, trimethylamine, morpholine, and N-methylmorpholine), organic alcoholamines (N,N-dimethylethanolamine, N-methyldiethanolamine, monoethanolamine, diethanolamine, and triethanolamine), ammonium salts (ammonium hydroxide and tetraalkylammonium hydroxides), and pyridine. In the case of a cationic block copolymer dispersant, the amine groups are neutralized with an acid, which may be an organic acid or inorganic acid. Examples of useful acids include organic acids (acetic acid, propionic acid, formic acid, and oxalic acid), hydroxylated acids (glycolic acid and lactic acid), halogenated acids (hydrochloric acid and hydrobromic acid), and inorganic acids (sulfuric acid, phosphoric acid, and nitric acid).

In each light pigment ink, the dispersant described above is used in an amount of preferably from 0.1 to 2.0% by weight, more preferably from 0.2 to 1.0% by weight, based on the pigment.

In the invention, the dark pigment inks can contain desired additives besides water and either the "microencapsulated pigment" or the "pigment and resinous dispersant". The light pigment inks also can contain desired additives besides the pigment and resinous dispersant and water.

Examples of such optional additives include various surfactants such as nonionic surfactants and cationic surfactants, water-soluble organic solvents as penetration accelerators, and humectants. These additives will be explained below in detail.

In the invention, the water to be contained in the dark pigment inks and light pigment inks (hereinafter sometimes referred to collectively as "pigment inks") is not particularly limited. It is, however, preferred to use pure water, such as ion-exchanged water, water purified by ultrafiltration, water purified by reverse osmosis, or distilled water, or ultrapure water. It is also preferred to use water sterilized by ultraviolet irradiation or addition of hydrogen peroxide, because it is effective in preventing the growth of mildew, bacteria, or the like.

According to a preferred embodiment of the invention, the pigment inks further contain a nonionic surfactant.

Examples of the nonionic surfactant include polyoxyethylene alkyl ethers, polyoxyethylene alkyl esters, polyoxyethylene sorbitan fatty acid esters, polyoxyethylene alkylphenyl ethers, polyoxyethylene alkylamines, polyoxyethylene alkylamides, and the acetylene glycol type surfactants which will be described below. These surfactants may be used as a mixture of two or more thereof.

In a preferred embodiment of the invention, the pigment inks preferably further contain an acetylene glycol type surfactant as a nonionic surfactant. In the invention, preferred examples of the acetylene glycol type surfactant include compounds represented by the following formula (a).

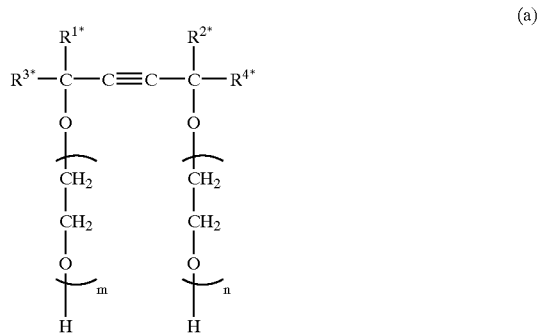

(a)

[In the formula, $0 \leq m+n \leq 50$ and $R^{1*}$, $R^{2*}$, $R^{3*}$, and $R^{4*}$ each independently represent an alkyl group (preferably an alkyl group having 1 to 6 carbon atoms).]

Especially preferred examples of the compounds represented by formula (a) include 2,4,7,9-tetramethyl-5-decyne-4,7-diol, 3,6-dimethyl-4-octyne-3,6-diol, and 3,5-dimethyl-1-hexyn-3-ol. Commercial products of acetylene glycol type surfactants represented by formula (a) can also be utilized. Examples thereof include Surfynol 82, 104, 440, 465, 485, or TG (all available from Air Products and Chemicals, Inc.); and Olfin STG and Olfin E1010 (trade name) (all manufactured by Nissin Chemical Industry Co., Ltd.). These acetylene glycol type surfactants may be used as a mixture of two or more thereof.

It is also preferred in the invention that a polyorganosiloxane be contained as a nonionic surfactant.

Preferred examples of the polyorganosiloxane include compounds represented by the following formula (I)

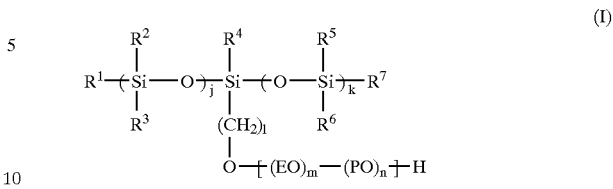

(I)

(In the formula, $R^1$ to $R^7$ each independently represent a $C_{1-6}$ alkyl group;

j, k and l each independently represent an integer of 1 or larger;

EO represents an ethyleneoxy group;

PO represents a propyleneoxy group;

m and n each represent an integer of 0 or larger, provided that m+n is an integer of 1 or larger; and the EO's and PO's in the bracket may be arranged in any order, and may be present randomly or form a block structure.)

In formula (I), $R^1$ to $R^7$ each independently represent a $C_{1-6}$ alkyl group, preferably methyl. Symbols j and k each independently represent an integer of 1 or larger, and preferably are 1 or 2. Symbols m and n each represent an integer of 0 or larger, provided that m+n is an integer of 1 or larger. Preferably, m+n is from 2 to 4.

Preferred compounds represented by formula (I) satisfy j=k=1. More preferred are compounds represented by formula (I) wherein $R^1$ to $R^7$ each represent methyl, j is 1, k is 1, l is 1, m is an integer of 1 or larger, and n is 0.

Although a compound represented by formula (I) may be added in an amount suitably determined, the amount thereof is preferably from 0.03 to 3% by weight, more preferably about from 0.1 to 2% by weight, most preferably about from 0.3 to 1% by weight, based on the pigment ink.

Compounds represented by formula (I) are on the market and such commercial products can be utilized. For example, use may be made of silicone surfactant BYK-347, manufactured by Byk-Chemie Japan K.K.

Other preferred examples of the polyorganosiloxane include compounds represented by the following formula (II).

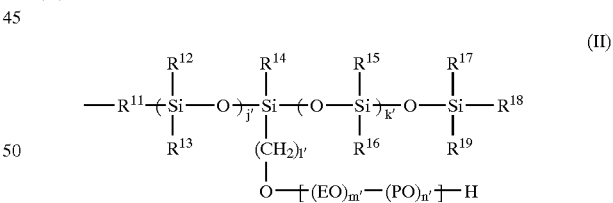

(II)

(In the formula, $R^{11}$ to $R^{19}$ each independently represent a $C_{1-6}$ alkyl group;

j', k' and l' each independently represent and integer of 1 or larger;

EO represents an ethyleneoxy group;

PO represents a propyleneoxy group;

m' and n' each represent an integer of 0 or larger, provided that m'+n' is an integer of 1 or larger; and the EO's and PO's in the bracket may be arranged in any order, and may be present randomly or form a block structure.)

In formula (II), $R^{11}$ to $R^{19}$ each independently represent a $C_{1-6}$ alkyl group, preferably methyl. Symbols j' and k' each independently represent in integer of 1 or larger, and preferably are 1 or 2. Symbols m' and n' each represent an integer of 0 or larger, provided that m'+n' is an integer of 1 or larger. Preferably, m'+n' is from 2 to 4.

According to a preferred embodiment of the invention, preferred compounds represented by formula (II) satisfy j'=k'+1. In another preferred embodiment of the invention, preferred compounds represented by formula (II) are those wherein $R^{11}$ to $R^{13}$ each represent methyl, j' is 2, k' is 1, l' is 1, m' is an integer of 1 or larger, and n' is 0.

Although a compound represented by formula (II) may be added in an amount suitably determined, the amount thereof is preferably from 0.03 to 3% by weight, more preferably about from 0.1 to 2% by weight, most preferably about from 0.3 to 1% by weight, based on the pigment ink.

Compounds represented by formula (II) are on the market, and such commercial products can be utilized. For example, use may be made of silicone surfactant BYK-345, BYK-346, and BYK-348, all manufactured by Byk-Chemie Japan K.K.

Also known as one kind of polyorganosiloxanes are modified polysiloxane compounds.

For example, JP-A-59-66470 discloses an ink composition for lithography which contains an organo-modified polysiloxane. JP-A-60-173068 discloses an ink composition containing a modified polysiloxane as an antifoamer. JP-A-5-169790 and JP-A-10-310732 disclose an ink composition for ink jet recording which contains a modified polysiloxane having a specific structure. Furthermore, JP-A-10-279871 discloses a dye ink composition containing a polyether-modified polysiloxane.

The inks to be used in the invention may contain as the polyorganosiloxane any of the modified polysiloxanes described in those references.

The amount of the nonionic surfactant to be added is in the range of preferably about from 0.1 to 5% by weight, more preferably about from 0.5 to 2% by weight, based on the pigment ink.

A water-soluble organic solvent may be incorporated, besides water, into the inks to be used in the invention for the purpose of regulating the humectant properties of the inks or imparting penetration property thereto. The water-soluble organic solvent to be used for regulating the humectant properties of the dark pigment inks and light pigment inks of the invention is added thereto as a humectant or drying accelerator. On the other hand, the water-soluble organic solvent for imparting penetration property to the pigment inks of the invention is added thereto as a penetration accelerator.

Examples of the water-soluble organic solvent for regulating the humectant properties of the inks include monohydric alcohols such as methanol, ethanol, n-propanol, isopropanol, n-butanol, sec-butanol, tert-butanol, isobutanol, and n-pentanol, polyhydric alcohols such as glycerol, ethylene glycol, diethylene glycol, triethylene glycol, polyethylene glycol, propylene glycol, butylene glycol, dipropylene glycol, polypropylene glycol, thiodiglycol, hexylene glycol, 1,3-propanediol, 1,4-butanediol, 1,5-pentanediol, 1,6-hexanediol, 1,2,6-hexanetriol, and pentaerythritol, 2-pyrrolidone, N-methyl-2-pyrrolidone, urea, thiourea, ethyleneurea, and 1,3-dimethyl-2-imidazolidinone.

Such water-soluble organic solvents for regulating the humectant properties of inks are added to pigment inks as humectants. In the invention, however, a humectant is used mainly in order to inhibit the inks from drying and to thereby prevent the inks from solidifying at the ejection nozzle of an ink jet recorder. Besides the water-soluble organic solvents enumerated above, examples of humectants usable in the invention include lactams such as ε-caprolactam, solid glycerol derivatives such as trimethylolpropane and trimethylolethane, and saccharides such as maltitol, sorbitol, gluconolactone, and maltose.

Examples of the water-soluble organic solvent for imparting penetration property to the inks, i.e., the penetration accelerator, preferably include glycol ethers, in particular, glycol monoethers.

A glycol monoether to be used in the invention is selected from monoether compounds of glycols such as mono- and polyethylene glycols and mono- and polypropylene glycols. Preferably, it is selected from compounds represented by the following formula (i):

$$R\text{—}O\text{—}[C_xH_{2x}\text{—}O]_y\text{—}H \qquad (i)$$

(wherein R is an alkyl group having 1 to 6 carbon atoms, a phenyl group, or a benzyl group, and preferably is methyl, ethyl, propyl, or butyl; x is 1 to 3, preferably 2 or 3; and y is 1 to 8, preferably 1 to 5, more preferably 1 to 3).

Specific examples of the penetration accelerator in the invention include ethylene glycol monomethyl ether, ethylene glycol monoethyl ether, ethylene glycol monobutyl ether, diethylene glycol monomethyl ether, diethylene glycol monoethyl ether, diethylene glycol mono-n-propyl ether, ethylene glycol monoisopropyl ether, diethylene glycol monoisopropyl ether, ethylene glycol mono-n-butyl ether, ethylene glycol mono-t-butyl ether, diethylene glycol mono-n-butyl ether, triethylene glycol monomethyl ether, triethylene glycol monoethyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol monoisopropyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol monoisopropyl ether.

Preferred of those are ethylene glycol mono-n-butyl ether, diethylene glycol mono-n-butyl ether, triethylene glycol mono-n-butyl ether, propylene glycol monobutyl ether, and dipropylene glycol monobutyl ether. These glycol ethers are known to have high compatibility with the 1,2-alkanediols shown below.

Also preferred as the penetration accelerator in the invention is a 1,2-alkanediol. Preferred 1,2-alkanediols are those having 4 to 10 carbon atoms. A mixture of two or more 1,2-alkanediols may be added.

A preferred 1,2-alkanediol is one selected from the group consisting of 1,2-butanediol, 1,2-pentanediol, 1,2-hexanediol, 1,2-heptanediol, and mixtures thereof.

These 1,2-alkanediols are more preferred because they have excellent penetration property with respect to recording media.

More preferred 1,2-alkanediols are 1,2-hexanediol and 1,2-pentanediol. Most preferred is 1,2-hexanediol.

The penetration accelerator to be used in the invention preferably is a combination of a 1,2-alkanediol and a glycol ether. When these two compounds are used in combination, the same penetration property can be imparted to the pigment inks with a smaller addition amount as compared with the case of using a 1,2-alkanediol alone. This penetration accelerator is effective also in inhibiting the ejection nozzle of an ink jet printer from being wetted by the inks. Furthermore, the ink adhesion to ejection nozzles which is caused by the addition of a 1,2-alkanediol can be effectively prevented by using a glycol ether in combination with the 1,2-alkanediol. Thus, the prevention of ink adhesion to the ejection nozzle of an ink jet recorder, in cooperation with the effect of reducing the addition amount described above, enables pigment inks having high printing stability to be provided.

In the case where a pigment ink according to the invention contains a glycol ether, the amount of the glycol ether incorporated is preferably in the range of from 0.25 to 10% by weight based on the pigment ink.

When the glycol ether amount is within that range, not only higher penetration property can be obtained by using a combination of the glycol ether with a 1,2-alkanediol, but also the viscosity of the ink can be regulated with the glycol ether in combination with one or more other additives so that the ink is usable in printing. The proportion of the glycol monoether to the 1,2-alkanediol (by weight) is in the range of preferably from 1:5 to 5:1, more preferably from 1:2 to 2:1.

Water-soluble organic solvents were explained above from the standpoints of organic solvents for regulating humectant properties and of organic solvents for imparting penetration property. However, there are cases where organic solvents shown as examples of the solvents for regulating humectant properties also function to impart penetration property to inks, and where organic solvents shown as examples of the solvents for imparting penetration property also function as humectants.

The pigment inks in the invention may further contain a surfactant so as to have accelerated penetration and ejection reliability and to give satisfactory images. Besides the nonionic surfactants enumerated above, examples of this surfactant include anionic surfactants (e.g., sodium dodecylbenzenesulfonate, sodium laurate, and the ammonium salts of polyoxyethylene alkyl ether sulfates), cationic surfactants, and amphoteric surfactants. These may be used alone or as a mixture of two or more thereof. The pigment inks according to the invention have a surface tension in the range of about from 20 to 50 mN/m, preferably about from 25 to 40 mN/m.

The pigment inks according to the invention may further contain a humectant. The humectant is used in order to inhibit the inks from drying and to thereby prevent the inks from solidifying at the ejection nozzle of an ink jet recorder.

Preferred examples of the humectant include polyols such as glycerol, ethylene glycol, diethylene glycol, triethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, and pentaerythritol, 2-pyrrolidone, and N-methyl-2-pyrrolidone. Namely, the humectant may be selected from water-soluble organic solvents having humectant properties and hygroscopicity. Other preferred examples of the humectant include urea compounds such as urea, thiourea, ethyleneurea, and 1,3-dimethylimidazolidinones, lactams such as ε-caprolactam, solid glycerol derivatives such as trimethylolpropane and trimethylolethane, and saccharides such as maltitol, sorbitol, gluconolactone, and maltose. Namely, the humectant may be selected from water-soluble hygroscopic materials.

The pigment inks according to the invention may further contain other optional ingredients such as a nozzle clogging inhibitor, antiseptic, antioxidant/ultraviolet absorber, conductivity regulator, pH regulator, dissolution aid, viscosity modifier, and oxygen absorber.

Examples of the antiseptic include sodium benzoate, sodium pentachlorophenoxide, sodium 2-pyridinethiol 1-oxide, sodium sorbitate, sodium dehydroacetate, and 1,2-dibenzothiazolin-3-one (Proxcel CRL, Proxcel BDN, Proxcel GXL, Proxcel XL-2, and Proxcel TN, manufactured by ICI Ltd.).

Examples of the pH regulator, dissolution aid, or antioxidant include amines such as diethanolamine, triethanolamine, propanolamine, and morpholine and modifications of these, inorganic salts such as potassium hydroxide, sodium hydroxide, and lithium hydroxide, ammonium hydroxide, quaternary-ammonium hydroxides (e.g., tetramethylammonium), carbonates such as potassium carbonate, sodium carbonate, and lithium carbonate, phosphates, N-methyl-2-pyrrolidone, urea compounds such as urea, thiourea, and tetramethylurea, allophanates such as allophanate, and methyl allophanate, buret compounds such as buret, dimethylburet, and tetramethylburet, and L-ascorbic acid and salts thereof. In the invention, the optional ingredients enumerated above may be used alone. Alternatively, two or more optional ingredients selected from one or more of the groups may be used in combination.

It is preferred in the invention that the amounts of all ingredients for each pigment ink be selected so that the pigment ink comes to have a viscosity at 20° C. of 10 mPa•s or lower.

The pigment inks according to the invention each can be produced by dispersing and mixing the ingredients by an appropriate method in ordinary use. In a preferred method, a mixture of the ingredients other than the organic solvent and any volatile ingredients is mixed together by means of an appropriate disperser (e.g., a ball mill, roll mill, sand mill, attritor, agitator mill, Henschel mixer, colloid mill, jet mill, Angmill, or ultrasonic homogenizer) to obtain a homogeneous composition, and the organic solvent and volatile ingredients are then added thereto. Thereafter, the resultant composition is preferably subjected to vacuum or pressure filtration through a metallic filter, membrane filter, or the like or to centrifugal separation in order to remove coarse particles and foreign particles.

Although the constitutions of the inks included in each ink set of the invention have been explained above, the ink sets of the invention each preferably comprise at least one dark pigment ink selected from the group consisting of a black ink, magenta ink, cyan ink, and yellow ink, and at least one light pigment ink selected from the group consisting of a black ink, magenta ink, cyan ink, and yellow ink.

Namely, the invention includes ink sets comprising various ink combinations, examples of which include: an ink set comprising a black ink as the dark pigment ink and a black ink as the light pigment ink; an ink set comprising a black ink and a magenta ink as the dark pigment inks and a black ink and a magenta ink as the light pigment inks; an ink set comprising a black ink and a magenta ink as the dark pigment inks and a black ink and a cyan ink as the light pigment inks; and an ink set comprising a black ink, magenta ink, and cyan ink as the dark pigment inks and a black ink, cyan ink, and yellow ink as the light pigment inks.

Preferred ink sets in the invention are ink sets each having a constitution in which the at least one dark pigment ink and the at least one light pigment ink correspond to each other in hue.

The constitution in which the at least one dark pigment ink corresponds in hue to the at least one light pigment ink means, for example, an ink set in which the dark pigment inks are a black ink and a magenta ink, and the light pigment inks are a black ink and a magenta ink; an ink set in which the dark pigment inks are a black ink, magenta ink, and cyan ink and the light pigment inks are a black ink, magenta ink, and cyan ink; or an ink set in which the dark pigment inks are a black ink, magenta ink, cyan ink, and yellow ink, and the light pigment inks are a black ink, magenta ink, cyan ink, and yellow ink. According to this constitution, an image with a specific hue having no graininess can be printed by controlling the ink duty of each of the dark pigment ink and the light pigment ink.

When ink jet recording is conducted with such an ink set for ink jet recording of the invention, images of excellent quality with almost no recognizable stain can be provided.

For practicing the ink jet recording process of the invention, any method can be used as long as it comprises ejecting at least one dark pigment ink and at least one light pigment ink as droplets from minute nozzles and adhering the droplets to a recording medium. Examples of the method include a technique employing an ink jet head operating by a mechanism based on responses of an electrostrictive element, i.e., a technique in which a pressure and printing information signals are simultaneously applied to each ink with an electrostrictive element to thereby eject ink droplets based on the resultant mechanical deformations and form an image. Examples thereof further include: a technique in which each ink is abruptly expanded by the action of heat energy; a technique based on electrostatic attraction; and a technique in which a pressure is applied to each ink with a small pump and the nozzle is mechanically oscillated with a quartz oscillator or the like to thereby forcibly eject ink droplets.

According to a more preferred embodiment of the invention, the ink jet recording process of the invention is preferably practical by the method employing ink jet heads which form ink droplets based on mechanical deformations caused by electrostrictive elements.

The recorded matter of the invention, which is obtained by the process described above, has excellent image quality with almost no recognizable stain.

EXAMPLES

The invention will be illustrated in greater detail with reference to the following Examples, but the invention should not be construed as being limited thereto.

(1) Preparation of Ink Compositions
Preparation of Ink Composition A1

The following ingredients were mixed together in the following proportion in a 1-L beaker so as to result in a total amount of 500 g. Thereto was added 4 g of tert-butyl peroxyoctoate as a polymerization initiator. Thus, a liquid mixture for resin synthesis was obtained.

| n-Butyl methacrylate | 40 wt % |
|---|---|
| n-Butyl acrylate | 5 wt % |
| Styrene | 20 wt % |
| 2-Hydroxyethyl methacrylate | 15 wt % |
| Methacrylic acid | 20 wt % |

Subsequently, 500 g of methyl ethyl ketone was placed in a 1-L flask and heated to 75° C. with stirring in a nitrogen atmosphere. While the ketone was being stirred at 75° C., the liquid mixture for resin synthesis was added dropwise thereto over 3 hours. This mixture was continuously reacted for further 8 hours with stirring at 75° C. Thereafter, the resultant reaction mixture was allowed to cool naturally to 25° C. and then diluted with methyl ethyl ketone to a solid content of 50%. Thus, a dispersing resin solution having an acid value (KOH) of 130 and an average molecular weight of 15,000 was obtained.

The ingredients shown below were used in that proportion to prepare a microencapsulated pigment in the following manner. First, the pigment was mixed with the dispersing resin solution synthesized above, and this mixture was treated for 2 hours with a sand mill (manufactured by Yasukawa Seisakusho) together with glass beads (diameter, 1.7 mm; used in an amount 1.5 times (by weight) the mixture) to disperse the pigment. Thereafter, the glass beads were removed, and the remaining ingredients were added thereto. This mixture was stirred at ordinary temperature for 20 minutes and then filtered through a 5-μm membrane filter.

The filtrate obtained was distilled at 80° C. and ordinary pressure to remove the solvent. To the residue was dropwise added, with stirring, 1 N hydrochloric acid solution to deposit a resin layer. The resultant mixture was subjected to suction filtration with rinsing with water to thereby obtain a hydrous cake. To this hydrous cake was dropwise added, with stirring, 5% aqueous potassium hydroxide solution to adjust the pH thereof to 9±0.5. Ultrapure water was further added thereto in such an amount as to result in a solid content of 20%. Thus, an aqueous dispersion of a microencapsulated pigment was obtained.

| C.I. Pigment Blue 15:3 | 15 wt % |
|---|---|
| 5% Aqueous potassium hydroxide solution | 4 wt % |
| Dispersing resin solution | 10 wt % |
| Ultrapure water | remainder |

Of the ingredients shown in Table 1, the solvents other than the microencapsulated pigment were mixed with stirring to prepare a mixed solution. Subsequently, this mixed solution was added dropwise to the aqueous microencapsulated-pigment dispersion with stirring. Thus, ink composition A1 was prepared.

Preparation of Ink Composition A1'

The same microencapsulated pigment as that for ink composition A1 was used to prepare ink composition A1' by conducting the same procedure as for ink composition A1, except that the pigment concentration was changed as shown in Table 1.

Preparation of Ink Composition A2

The same procedure as for ink composition A1 was conducted, except that C.I. Pigment Red 122 was used in place of C.I. Pigment Blue 15:3 and that the pigment concentration was changed as shown in Table 1. Thus, ink composition A2 was prepared.

Preparation of Ink Composition A2'

The same microencapsulated pigment as that for ink composition A2 was used to prepare ink composition A2' by conducting the same procedure as for ink composition A2, except that the pigment concentration was changed as shown in Table 1.

Preparation of Ink Composition A3

The same microencapsulated pigment as that for ink composition A1 was used to prepare ink composition A3 by conducting the same procedure as for ink composition A1, except that the pigment concentration was changed as shown in Table 1.

(Preparation of Dispersant α)

Dispersant α for use in pigment dispersion was prepared in the following manner. This method of preparing dispersant α was in accordance with a procedure described in JP-A-11-269418.

Dispersant α: t-Butylstyrene/styrene/methacrylic acid (27/18/55 wt %) block copolymer First, the following ingredients were prepared, and macromonomer a was prepared therefrom in the following manner.

|  | Ingredient | Weight (g) |
|---|---|---|
| Portion 1: | Methanol | 233.4 |
|  | Isopropanol | 120.3 |
| Portion 2: | Methacrylic acid monomer | 238.1 |
|  | Methanol | 39.3 |
| Portion 3: | Isopropylbis(borodichloromethylglyoximato)-cobalt(III) salt | 0.143 |
|  | 2,2'-Azobis (2,2-dimethylvaleronitrile) (Vazo (trademark); manufactured by du Pont) | 6.52 |
|  | Acetone | 87.2 |

A mixture of portion 1 was charged into a 2-L flask equipped with a thermometer, stirrer, funnel for addition, reflux condenser, and device for maintaining a nitrogen blanket for reaction mixture covering. The mixture was heated at a reflux temperature and refluxed for about 20 minutes. While this reaction mixture was kept at the reflux temperature, portions 2 and 3 were added thereto simultaneously. The addition of portion 2 took 4 hours, while the addition of portion 3 took 4.5 hours. After refluxing was continued for further 2 hours, the resultant solution was cooled to room temperature to obtain macromonomer solution a.

Subsequently, the following ingredients were prepared besides the macromonomer a obtained, and dispersant α was prepared in the following manner.

|  | Ingredient | Weight (g) |
|---|---|---|
| Portion 1a: | Macromonomer a | 152.4 |
|  | 2-Pyrrolidone | 40.0 |
| Portion 2a: | Lupersol 11 (t-butyl peroxypivalate) (manufactured by Elf Arochem North America) | 0.67 |
|  | Acetone | 10.0 |
| Portion 3a: | 1-Butylstyrene | 27.0 |
|  | Styrene | 18.0 |
| Portion 4a: | Lupersol 11 | 2.67 |
|  | Acetone | 20.0 |
| Portion 5a: | Lupersol 11 | 0.67 |
|  | Acetone | 10.0 |

A mixture of portion 1a was charged into a 500-mL flask equipped with a thermometer, stirrer, funnel for addition, reflux condenser, and device for maintaining a nitrogen blanket for reaction mixture covering. This mixture was heated at a reflux temperature and refluxed for about 10 minutes. Portion 2a, which was a solution, was added. Subsequently, while the reaction mixture was kept at the reflux temperature, portions 3a and 4a were added thereto simultaneously. The addition of portions 3a and 4a took 3 hours. After this reaction mixture was refluxed for 1 hour, portion 5a, which was a solution, was added thereto. Subsequently, the resultant reaction mixture was refluxed for further 1 hour. The mixture was distilled until the amount of volatiles thus recovered reached about 117 g. To this residue was added 75.0 g of 2-pyrrolidone. Thus, 239.0 g of a 41.8% polymer solution (dispersant α) was obtained.

Preparation of Ink Composition A4

A hundred grams of C.I. Pigment Blue 15:3 as a cyan pigment was mixed with 50 g of dispersant α, 10 g of potassium hydroxide, and 250 g of water. This mixture was subjected to a 10-hour dispersion treatment with a ball mill using zirconia beads. The crude dispersion obtained was filtered through a membrane filter having a pore diameter of 8 μm (manufactured by Nippon Millipore Ltd.) to remove coarse particles. The filtrate was diluted with water to a pigment concentration of 20% to prepare cyan pigment dispersion A4.

Twenty grams of the cyan pigment dispersion A4 obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 μm. Thus, ink composition A4 was prepared.

Preparation of Ink Composition A4'

Cyan pigment dispersion A4 was prepared in the same manner as for ink composition A4. Ten grams of the cyan pigment dispersion A4 obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 μm. Thus, ink composition A4' was prepared.

Preparation of Ink Composition A5

A hundred grams of C.I. Pigment Red 122 as a magenta pigment was mixed with 50 g of dispersant α, 10 g of potassium hydroxide, and 250 g of water. This mixture was subjected to a 10-hour dispersion treatment with a ball mill using zirconia beads. The crude dispersion obtained was filtered through a membrane filter having a pore diameter of 8 μm (manufactured by Nippon Millipore Ltd.) to remove coarse particles. The filtrate was diluted with water to a pigment concentration of 20% to prepare magenta pigment dispersion A5.

Fifteen grams of the magenta pigment dispersion A5 obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 μm. Thus, ink composition A5 was prepared.

Preparation of Ink Composition B1

A hundred grams of C.I. Pigment Blue 15:3 as a cyan pigment was mixed with 50 g of dispersant α, 10 g of potassium hydroxide, and 250 g of water. This mixture was subjected to a 10-hour dispersion treatment with a ball mill using zirconia beads. The crude dispersion obtained was filtered through a membrane filter having a pore diameter of 8 μm (manufactured by Nippon Millipore Ltd.) to remove coarse particles. The filtrate was diluted with water to a pigment concentration of 20% to prepare cyan pigment dispersion B1.

Five grams of the cyan pigment dispersion B1 obtained was mixed with 15 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 μm. Thus, ink composition B1 was prepared.

Preparation of Ink Composition B1'

Cyan pigment dispersion B1 was prepared in the same manner as for ink composition B1. A 2.5 g portion of the cyan pigment dispersion B1 obtained was mixed with 15 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition B1' was prepared.

Preparation of Ink Composition B2

A hundred grams of C.I. Pigment Red 122 as a magenta pigment was mixed with 20 g of dispersant α, 4 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare magenta pigment dispersion B2.

Five grams of the magenta pigment dispersion B2 obtained was mixed with 15 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition B2 was prepared.

Preparation of Ink Composition B2'

Magenta pigment dispersion B2 was prepared in the same manner as for ink composition B2. A 3.75 g portion of the magenta pigment dispersion B2 obtained was mixed with 15 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition B2' was prepared.

Preparation of Ink Composition B3

Five grams of the cyan pigment dispersion B1 prepared above was mixed with 15 g of glycerol, 5 g of triethylene glycol monobutyl ether, and 1 g of Olfin E1010 (trade name of Nissin Chemical Industry Co., Ltd.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition B3 was prepared.

Preparation of Ink Composition B4

The same procedure as for ink composition A2 was conducted, except that the pigment concentration was changed as shown in Table 2. Thus, ink composition B4 was prepared.

Preparation of Ink Composition Aa1

A hundred grams of C.I. Pigment Blue 15:3 as a cyan pigment was mixed with 50 g of a styrene/acrylic acid resin (acid value, 80; molecular weight, 7,000), 4.5 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare cyan pigment dispersion Aa1.

Twenty grams of the cyan pigment dispersion Aa1 obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Aa1 was prepared.

Preparation of Ink Composition Aa1'

A hundred grams of C.I. Pigment Blue 15:3 as a cyan pigment was mixed with 50 g of a styrene/acrylic acid resin (acid value, 80; molecular weight, 7,000), 4.5 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare cyan pigment dispersion Aa1'.

Ten grams of the cyan pigment dispersion Aa1' obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Aa1' was prepared.

Preparation of Ink Composition Aa2

A hundred grams of C.I. Pigment Red 122 as a magenta pigment was mixed with 20 g of a styrene/acrylic acid resin (acid value, 80; molecular weight, 7,000), 2 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare magenta pigment dispersion Aa2.

Thirty grams of the magenta pigment dispersion Aa2 obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Aa2 was prepared.

Preparation of Ink Composition Aa2'

A hundred grams of C.I. Pigment Red 122 as a magenta pigment was mixed with 20 g of a styrene/acrylic acid resin (acid value, 80; molecular weight, 7,000), 2 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare magenta pigment dispersion Aa2'.

Fifteen grams of the magenta pigment dispersion Aa2' obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Aa2' was prepared.

Preparation of Ink Composition Aa3

Twenty grams of the cyan pigment dispersion Aa1 prepared above was mixed with 10 g of glycerol, 5 g of triethylene glycol monobutyl ether, and 1 g of Olfin E1010 (trade name of Nissin Chemical Industry Co., Ltd.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Aa3 was prepared.

Preparation of Ink Composition Aa4

A hundred grams of C.I. Pigment Blue 15:3 as a cyan pigment was mixed with 50 g of a styrene/acrylic acid resin (acid value, 180; molecular weight, 7,000), 10 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare cyan pigment dispersion Aa4.

Twenty grams of the cyan pigment dispersion Aa4 obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Aa4 was prepared.

Preparation of Ink Composition Aa4'

A hundred grams of C.I. Pigment Blue 15:3 as a cyan pigment was mixed with 50 g of a styrene/acrylic acid resin (acid value, 180; molecular weight, 7,000), 10 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare cyan pigment dispersion Aa4'.

Ten grams of the cyan pigment dispersion Aa4' obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Aa4' was prepared.

Preparation of Ink Composition Aa5

A hundred grams of C.I. Pigment Red 122 as a magenta pigment was mixed with 20 g of a styrene/acrylic acid resin (acid value, 180; molecular weight, 7,000), 2 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare cyan pigment dispersion Aa5.

Fifteen grams of the magenta pigment dispersion Aa5 obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Aa5 was prepared.

Preparation of Ink Composition Bb1

A hundred grams of C.I. Pigment Blue 15:3 as a cyan pigment was mixed with 50 g of a styrene/acrylic acid resin (acid value, 180; molecular weight, 7,000), 10 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare cyan pigment dispersion Bb1.

Five grams of the cyan pigment dispersion Bb1 obtained was mixed with 15 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Bb1 was prepared.

Preparation of Ink Composition Bb1'

A hundred grams of C.I. Pigment Blue 15:3 as a cyan pigment was mixed with 50 g of a styrene/acrylic acid resin (acid value, 180; molecular weight, 7,000), 10 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare cyan pigment dispersion Bb1'.

A 2.5 g portion of the cyan pigment dispersion Bb1' obtained was mixed with 15 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 µm. Thus, ink composition Bb1' was prepared.

Preparation of Ink Composition Bb2

A hundred grams of C.I. Pigment Red 122 as a magenta pigment was mixed with 20 g of a styrene/acrylic acid resin (acid value, 180; molecular weight, 7,000), 4 g of potassium hydroxide, and 250 g of water. This mixture was subjected to a 10-hour dispersion treatment with a ball mill using zirconia beads. The crude dispersion obtained was filtered through a membrane filter having a pore diameter of 8 µm (manufactured by Nippon Millipore Ltd.) to remove coarse particles. The filtrate was diluted with water to a pigment concentration of 20% to prepare magenta pigment dispersion Bb2.

Five grams of the magenta pigment dispersion Bb2 obtained was mixed with 15 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 μm Thus, ink composition Bb2 was prepared.

Preparation of Ink Composition Bb2'

A hundred grams of C.I. Pigment Red 122 as a magenta pigment was mixed with 20 g of a styrene/acrylic acid resin (acid value, 180; molecular weight, 7,000), 4 g of potassium hydroxide, and 250 g of water. This mixture was subjected to a 10-hour dispersion treatment with a ball mill using zirconia beads. The crude dispersion obtained was filtered through a membrane filter having a pore diameter of 8 μm (manufactured by Nippon Millipore Ltd.) to remove coarse particles. The filtrate was diluted with water to a pigment concentration of 20% to prepare magenta pigment dispersion Bb2'.

A 3.75 g portion of the magenta pigment dispersion Bb2' obtained was mixed with 15 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 μm. Thus, ink composition Bb2' was prepared.

Preparation of Ink Composition Bb3

Five grams of the cyan pigment dispersion Bb1 prepared above was mixed with 15 g of glycerol, 5 g of triethylene glycol monobutyl ether, and 1 g of Olfin E1010 (trade name of Nissin Chemical Industry Co., Ltd.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 μm. Thus, ink composition Bb3 was prepared.

Preparation of Ink Composition Bb4

A hundred grams of C.I. Pigment Red 122 as a magenta pigment was mixed with 50 g of a styrene/acrylic acid resin (acid value, 80; molecular weight, 7,000), 4.5 g of potassium hydroxide, and 250 g of water. This mixture was subjected to a 10-hour dispersion treatment with a ball mill using zirconia beads. The crude dispersion obtained was filtered through a membrane filter having a pore diameter of 8 μm (manufactured by Nippon Millipore Ltd.) to remove coarse particles. The filtrate was diluted with water to a pigment concentration of 20% to prepare magenta pigment dispersion Bb4.

Five grams of the magenta pigment dispersion Bb4 obtained was mixed with 10 g of glycerol, 5 g of 1,2-hexanediol, and 0.5 g of BYK-347 (trade name of Byk-Chemie K.K.). Ultrapure water was further added thereto to adjust the total amount to 100 g. The pH of this mixture was adjusted to 9.5 with triethanolamine as a pH regulator. After this mixture was stirred for 2 hours, it was filtered through a membrane filter having a pore diameter of 1.2 μm. Thus, ink composition Bb4 was prepared.

(2) Production of Ink Sets

The ink compositions obtained above were used to produce ink sets.

Ink Set of Example 1

A cyan ink set composed of ink A1 as a dark ink and ink B1 as a light ink.

Ink Set of Example 2

A magenta ink set composed of ink A2 as a dark ink and ink B2 as a light ink.

Ink Set of Example 3

A cyan ink set composed of ink A3 as a dark ink and ink B3 as a light ink.

Ink Set of Example 4

A cyan ink set composed of ink A1' as a dark ink and ink B1' as a light ink.

Ink Set of Example 5

A magenta ink set composed of ink A2' as a dark ink and ink B2' as a light ink.

Ink Set of Comparative Example 1

A magenta ink set composed of ink A2 as a dark ink and ink B4 as a light ink.

Ink Set of Comparative Example 2

A cyan ink set composed of ink A4 as a dark ink and ink B1 as a light ink.

Ink Set of Comparative Example 3

A magenta ink set composed of ink A5 as a dark ink and ink B2' as a light ink.

Ink Set of Comparative Example 4

A cyan ink set composed of ink A4' as a dark ink and ink B1' as a light ink.

Ink Set of Example 6

A cyan ink set composed of ink Aa1 as a dark ink and ink Bb1 as a light ink.

Ink Set of Example 7

A magenta ink set composed of ink Aa2 as a dark ink and ink Bb2 as a light ink.

Ink Set of Example 8

A cyan ink set composed of ink Aa3 as a dark ink and ink Bb3 as a light ink.

Ink Set of Example 9

A cyan ink set composed of ink Aa1' as a dark ink and ink Bb1' as a light ink.

Ink Set of Example 10

A magenta ink set composed of ink Aa2' as a dark ink and ink Bb2' as a light ink.

Ink Set of Comparative Example 5

A magenta ink set composed of ink Aa2 as a dark ink and ink Bb4 as a light ink.

Ink Set of Comparative Example 6

A cyan ink set composed of ink Aa4 as a dark ink and ink Bb1 as a light ink.

Ink Set of Comparative Example 7

A magenta ink set composed of ink Aa5 as a dark ink and ink Bb2' as a light ink.

Ink Set of Comparative Example 8

A cyan ink set composed of ink Aa4' as a dark ink and ink Bb1' as a light ink.

(3) Evaluation

Ink Transfer

The ink set of each of the Examples and Comparative Examples was charged into the cyan ink and light-cyan ink cartridges or the magenta ink and light-magenta ink cartridges of ink jet printer PM900C (manufactured by Seiko Epson Corp.). Five kinds of color patches differing in the proportion of the dark ink to the light ink to be mixed therewith were printed on each of the following four printing media. Each color patch was 2 cm square, and the printing duty was set so that the sum of the duty of the dark ink and that of the light ink was 100%. The printing mode selected was "plain paper/beautiful".

MC Photographic Paper (Seiko Epson Corp.)
MC Glossy Paper (Seiko Epson Corp.)
Superfine Paper (Seiko Epson Corp.)
Plain Paper Xerox P (Xerox Co., Ltd.)

Whether the paper roller beneath which color patches had passed transferred the ink to nonimage areas was judged based on the following criteria.

A: No ink transfer occurred on all the media.
B: Ink transfer occurred on one or two papers.
C: Ink transfer occurred on three or more papers.

Evaluation of Ink Fixation

The ink set of each of the Examples and Comparative Examples was charged into the cyan ink and light-cyan ink cartridges or the magenta ink and light-magenta ink cartridges of ink jet printer PM900C (manufactured by Seiko Epson Corp.). Printing was conducted on MC Glossy Paper. At 30 minutes after the printing, the image area was vigorously rubbed with a finger to evaluate ink fixation based on the following criteria.

A: No staining occurred.
B: Slight staining occurred.
C: Staining occurred.

Evaluation of Gloss Unevenness

The ink set of each of the Examples and Comparative Examples was charged into the cyan ink and light-cyan ink cartridges or the magenta ink and light-magenta ink cartridges of ink jet printer PM900C (manufactured by Seiko Epson Corp.). Color patches were printed on MC Photographic Paper at printing duties of 10%, 20%, 40%, 60%, 80%, and 100%.

A: Almost no noticeable difference in gloss was observed between the different printing duties.
B: A difference in gloss was observed between different printing duties but was inconspicuous.
C: A conspicuous difference in gloss was observed between different printing duties.

Evaluation of Color Development

The ink set of each of the Examples and Comparative Examples was charged into the dark-cyan ink and light-cyan ink cartridges or the dark-magenta ink and light-magenta ink cartridges of ink jet printer PM900C (manufactured by Seiko Epson Corp.). Color patches were printed on MC Matte Paper (manufactured by Seiko Epson Corp.) at a printing duty of 100%. The optical density (OD) of the color patches was measured one day after the printing, and evaluated based on the following criteria.

A: OD was 1.3 or higher.
B: OD was 1.0 or higher but below 1.3.

The components of the ink set of each of the Examples and Comparative Examples and the results of the evaluation thereof are summarized in Tables 1 to 4.

TABLE 1

| | | Ink set | | | | | | | | |
|---|---|---|---|---|---|---|---|---|---|---|
| | | Example 1 | | Example 2 | | Example 3 | | Example 4 | | Example 5 | |
| | Ink | ink A1 | ink B1 | ink A2 | ink B2 | ink A3 | ink B3 | ink A1' | ink B1' | ink A2' | ink B2' |
| Composition | Kind of pigment | PB15:3 | PB15:3 | PR122 | PR122 | PB15:3 | PB15:3 | PB15:3 | PB15:3 | PR122 | PR122 |
| | Pigment concentration* | 4% | 1% | 6% | 1% | 4% | 1% | 2% | 0.5% | 3% | 0.75% |
| | Pigment dispersion type | microcapsule | resinous dispersant | microcapsule | resinous dispersant | microcapsule | resinous dispersant | microcapsule | resinous dispersant | microcapsule | resinous dispersant |
| | Glycerol | 10% | 15% | 10% | 15% | 10% | 15% | 10% | 15% | 10% | 15% |
| | BYK-347 | 0.50% | 0.50% | 0.50% | 0.50% | — | — | 0.50% | 0.50% | 0.50% | 0.50% |
| | 1,2-Hexanediol | 5% | 5% | 5% | 5% | — | — | 5% | 5% | 5% | 5% |
| | Olfin E1010 | — | — | — | — | 1% | 1% | — | — | — | — |
| | Triethylene glycol monobutyl ether | — | — | — | — | 5% | 5% | — | — | — | — |
| | Pure water | remainder | remainder | remainder | remainder | remainder | remainder | remainder | remainder | remainder | remainder |
| Evaluation | Ink transfer | A | | A | | A | | A | | A | |
| | Ink fixation | A | | B | | A | | A | | B | |
| | Gloss unevenness | A | | A | | A | | A | | A | |
| | Color development | A | | A | | A | | B | | B | |

*Microcapsule pigment concentration in the case of microencapsulated pigment.
PB15:3: C.I. Pigment Blue 15:3
PR122: C.I. Pigment Red 122

TABLE 2

| | | Ink set | | | | | | | |
|---|---|---|---|---|---|---|---|---|---|
| | | Comparative Example 1 | | Comparative Example 2 | | Comparative Example 3 | | Comparative Example 4 | |
| | Ink | ink A2 | ink B4 | ink A4 | ink B1 | ink A5 | ink B2' | ink A4' | ink B1' |
| Composition | Kind of pigment | PR122 | PR122 | PB15:3 | PB15:3 | PR122 | PR122 | PB15:3 | PB15:3 |
| | Pigment concentration* | 6% | 1% | 4% | 1% | 3% | 0.75% | 2% | 0.5% |
| | Pigment dispersion type | microcapsule | microcapsule | resinous dispersant | resinous dispersant | resinous dispersant | resinous dispersant | resinous dispersant | resinous dispersant |
| | Glycerol | 10% | 15% | 10% | 15% | 10% | 15% | 10% | 15% |
| | BYK-347 | 0.50% | 0.50% | 0.50% | 0.50% | 0.50% | 0.50% | 0.50% | 0.50% |
| | 1,2-Hexanediol | 5% | 5% | 5% | 5% | 5% | 5% | 5% | 5% |
| | Olfin E1010 | — | — | — | — | — | — | — | — |
| | Triethylene glycol monobutyl ether | — | — | — | — | — | — | — | — |
| | Pure water | remainder | remainder | remainder | remainder | remainder | remainder | remainder | remainder |

TABLE 2-continued

|  |  | Ink set | | | | | | | |
|---|---|---|---|---|---|---|---|---|---|
|  |  | Comparative Example 1 | | Comparative Example 2 | | Comparative Example 3 | | Comparative Example 4 | |
|  | Ink | ink A2 | ink B4 | ink A4 | ink B1 | ink A5 | ink B2' | ink A4' | ink B1' |
| Evaluation | Ink transfer | A | | C | | B | | C | |
|  | Ink fixation | C | | A | | B | | A | |
|  | Gloss unevenness | B | | B | | B | | B | |
|  | Color development | A | | A | | B | | B | |

*Microcapsule pigment concentration in the case of microencapsulated pigment.
PB15:3: C.I. Pigment Blue 15:3
PR122: C.I. Pigment Red 122

TABLE 3

|  |  | Ink set | | | | | | | | | |
|---|---|---|---|---|---|---|---|---|---|---|---|
|  |  | Example 6 | | Example 7 | | Example 8 | | Example 9 | | Example 10 | |
|  | Ink | ink Aa1 | ink Bb1 | ink Aa2 | ink Bb2 | ink Aa3 | ink Bb3 | ink Aa1' | ink Bb1' | ink Aa2' | ink Bb2' |
| Composition | Kind of pigment | PB15:3 | PB15:3 | PR122 | PR122 | PB15:3 | PB15:3 | PB15:3 | PB15:3 | PR122 | PR122 |
|  | Pigment concentration | 4% | 1% | 6% | 1% | 4% | 1% | 2% | 0.5% | 3% | 0.75% |
|  | Acid value of resin | 80 | 180 | 80 | 180 | 80 | 180 | 80 | 180 | 80 | 180 |
|  | Glycerol | 10% | 15% | 10% | 15% | 10% | 15% | 10% | 15% | 10% | 15% |
|  | BYK-347 | 0.50% | 0.50% | 0.50% | 0.50% | — | — | 0.50% | 0.50% | 0.50% | 0.50% |
|  | 1,2-Hexanediol | 5% | 5% | 5% | 5% | — | — | 5% | 5% | 5% | 5% |
|  | Olfin E1010 | — | — | — | — | 1% | 1% | — | — | — | — |
|  | Triethylene glycol monobutyl ether | — | — | — | — | 5% | 5% | — | — | — | — |
|  | Pure water | remainder | remainder | remainder | remainder | remainder | remainder | remainder | remainder | remainder | remainder |
| Evaluation | Ink transfer | A | | A | | A | | A | | A | |
|  | Ink fixation | A | | B | | A | | A | | B | |
|  | Gloss unevenness | A | | A | | A | | A | | A | |
|  | Color development | A | | A | | A | | B | | B | |

PB15:3: C.I. Pigment Blue 15:3
PR122: C.I. Pigment Red 122

TABLE 4

|  |  | Ink set | | | | | | | |
|---|---|---|---|---|---|---|---|---|---|
|  |  | Comparative Example 5 | | Comparative Example 6 | | Comparative Example 7 | | Comparative Example 8 | |
|  | Ink | ink Aa2 | ink Bb4 | ink Aa4 | ink Bb1 | ink Aa5 | ink Bb2' | ink Aa4' | ink Bb1' |
| Composition | Kind of pigment | PR122 | PR122 | PB15:3 | PB15:3 | PR122 | PR122 | PB15:3 | PB15:3 |
|  | Pigment concentration | 6% | 1% | 4% | 1% | 3% | 0.75% | 2% | 0.5% |
|  | Acid value of resin | 80 | 80 | 180 | 180 | 180 | 180 | 180 | 180 |
|  | Glycerol | 10% | 15% | 10% | 15% | 10% | 15% | 10% | 15% |
|  | BYK-347 | 0.50% | 0.50% | 0.50% | 0.50% | 0.50% | 0.50% | 0.50% | 0.50% |
|  | 1,2-Hexanediol | 5% | 5% | 5% | 5% | 5% | 5% | 5% | 5% |
|  | Olfin E1010 | — | — | — | — | — | — | — | — |
|  | Triethylene glycol monobutyl ether | — | — | — | — | — | — | — | — |
|  | Pure water | remainder | remainder | remainder | remainder | remainder | remainder | remainder | remainder |
| Evaluation | Ink transfer | A | | C | | B | | C | |
|  | Ink fixation | C | | A | | B | | A | |
|  | Gloss unevenness | B | | B | | B | | B | |
|  | Color development | A | | A | | B | | B | |

PB15:3: C.I. Pigment Blue 15:3
PR122: C.I. Pigment Red 122

Table 1 shows that the ink sets of Examples 1 to 5 were free from ink transfer and satisfactorily fixable and caused almost no gloss unevenness.

In particular, the ink sets of Examples 1 and 3, in which the dark cyan inks had a pigment concentration of 3% by weight or higher, and the ink set of Example 2, in which the dark magenta ink had a pigment concentration of 5% by weight or higher, were free from ink transfer and could give printed matters having excellent color development.

On the other hand, Table 2 shows that the ink sets of Comparative Examples 1 to 4, in each of which the dark pigment ink and the light pigment ink were equal in pigment dispersion type, were poorly fixable and caused gloss unevenness.

In particular, when the ink sets of Comparative Examples 2 to 4, in each of which the pigment dispersion type for the dark pigment ink and that for the light pigment ink each were one based on a resinous dispersant, were used, then ink transfer occurred. Although the ink set of Comparative Example 2, in which the dark cyan ink had a pigment concentration of 3% by weight or higher, brought about excellent color development, considerable ink transfer occurred therewith.

Table 3 shows that the ink sets of Examples 6 to 10 were free from ink transfer and satisfactorily fixable and caused almost no gloss unevenness.

In particular, the ink sets of Examples 6 and 8, in which the dark cyan inks had a pigment concentration of 3% by weight or higher, and the ink set of Example 7, in which the dark magenta ink had a pigment concentration of 5% by weight or higher, were free from ink transfer and could give printed matters having excellent color development.

On the other hand, Table 4 shows that the ink sets of Comparative Examples 5 to 8, in each of which the dark pigment ink and the light pigment ink were equal in acid value, were poorly fixable and caused gloss unevenness.

In particular, when the ink sets of Comparative Examples 6 to 8, in each of which the acid value for the dark pigment ink and that for the light pigment ink each were 180, were used, then ink transfer occurred. Although the ink set of Comparative Example 6, in which the dark cyan ink had a pigment concentration of 3% by weight or higher, brought about excellent color development, considerable ink transfer occurred therewith.

According to the invention, ink sets for ink jet recording and ink jet recording processes can be provided which give images of excellent quality with almost no recognizable stain and which are excellent in image fixation and less apt to cause gloss unevenness. The invention can further provide recorded matter which has excellent image quality with almost no recognizable stain, have excellent image fixation, and are less apt to have gloss unevenness.

While the invention has been described in detail and with reference to specific embodiments thereof, it will be apparent to one skilled in the art that various changes and modifications can be made therein without departing from the spirit and scope thereof.

What is claimed is:

1. An ink set for ink jet recording which comprises: at least one dark pigment ink comprising a pigment and water, wherein the pigment is one microencapsulated in a resin; and at least one light pigment ink comprising a pigment, a resinous dispersant, and water, wherein the concentration of the pigment is up to ½ the pigment concentration in the dark pigment ink.

2. The ink set for ink jet recording of claim 1, wherein the resinous dispersant in the light pigment ink is a block copolymer.

3. The ink set for ink jet recording of claim 1, wherein the dark pigment ink is a cyan ink or a magenta ink.

4. The ink set for ink jet recording of claim 3, wherein the pigment contained in the cyan ink is C.I. Pigment Blue 15:3.

5. The ink set for ink jet recording of claim 3, wherein the cyan ink has a pigment concentration of 3% by weight or higher.

6. The ink set for ink jet recording of claim 3, wherein the pigment contained in the magenta ink is C.I. Pigment Red 122.

7. The ink set for ink jet recording of claim 3, wherein the magenta ink has a pigment concentration of 5% by weight or higher.

8. The ink set for ink jet recording of claim 1, wherein the dark pigment ink and the light pigment ink each further contain a surfactant and a penetration accelerator.

9. The ink set for ink jet recording of claim 8, wherein the surfactant comprises acetylene glycol and/or a polyorganosiloxane.

10. The ink set for ink jet recording of claim 8, wherein the penetration accelerator comprises a glycol ether and/or a 1,2-alkanediol.

11. An ink jet recording process which comprises conducting ink jet recording with an ink set for ink jet recording of claim 1.

12. Recorded matter obtained by an ink jet recording process of claim 11.

13. An ink set for ink jet recording which comprises: at least one dark pigment ink comprising a pigment, a resinous dispersant, and water; and at least one light pigment ink which comprises a pigment, a resinous dispersant, and water, and in which the concentration of the pigment is up to ½ the pigment concentration in the dark pigment ink, wherein the resinous dispersant in the dark pigment ink has a lower acid value than the resinous dispersant in the light pigment ink.

14. The ink set for ink jet recording of claim 13, wherein the acid value of the resinous dispersant in the dark pigment ink is from 50 to 120 and the acid value of the resinous dispersant in the light pigment ink is 150 or higher.

15. The ink set for ink jet recording of claim 13, wherein the dark pigment ink is a cyan ink or a magenta ink.

16. The ink set for ink jet recording of claim 15, wherein the pigment contained in the cyan ink is C.I. Pigment Blue 15:3.

17. The ink set for ink jet recording of claim 15, wherein the cyan ink has a pigment concentration of 3% by weight or higher.

18. The ink set for ink jet recording of claim 15, wherein the pigment contained in the magenta ink is C.I. Pigment Red 122.

19. The ink set for ink jet recording of claim 15, wherein the magenta ink has a pigment concentration of 5% by weight or higher.

20. The ink set for ink jet recording of claim 13, wherein the dark pigment ink and the light pigment ink each further contain a surfactant and a penetration accelerator.

21. The ink set for ink jet recording of claim 20, wherein the surfactant comprises acetylene glycol and/or a polyorganosiloxane.

22. The ink set for ink jet recording of claim 20, wherein the penetration accelerator comprises a glycol ether and/or a 1,2-alkanediol.

23. An ink jet recording process which comprises conducting ink jet recording with an ink set for ink jet recording of claim 13.

24. Recorded matter obtained by an ink jet recording process of claim 23.

* * * * *